(12) United States Patent
Chu et al.

(10) Patent No.: US 10,866,397 B2
(45) Date of Patent: Dec. 15, 2020

(54) MICROSCOPE APPARATUS

(71) Applicant: TAIWAN SEMICONDUCTOR MANUFACTURING COMPANY, LTD., Hsinchu (TW)

(72) Inventors: Fu-Sheng Chu, Zhubei (TW); Chih-Shiang Chou, Pingzhen (TW); Yu-Po Tang, Taipei (TW); Yan-Ying He, Taipei (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 16/395,101

(22) Filed: Apr. 25, 2019

(65) Prior Publication Data

US 2019/0250393 A1    Aug. 15, 2019

Related U.S. Application Data

(60) Division of application No. 14/559,492, filed on Dec. 3, 2014, now Pat. No. 10,295,813, which is a
(Continued)

(51) Int. Cl.
*G02B 21/14* (2006.01)
*G02B 21/36* (2006.01)
*G02B 26/06* (2006.01)

(52) U.S. Cl.
CPC ............. *G02B 21/14* (2013.01); *G02B 21/36* (2013.01); *G02B 26/06* (2013.01)

(58) Field of Classification Search
CPC ................ G02B 21/14; G02B 21/0092; G02B 21/0068; G02B 21/06; G02B 21/16;
(Continued)

(56) References Cited

U.S. PATENT DOCUMENTS 5,661,560 A * 8/1997 Ozaki .................. G01N 21/956
                                                                250/225
5,969,856 A   10/1999 Greenberg
(Continued)

FOREIGN PATENT DOCUMENTS

WO       2011029535      3/2011

*Primary Examiner* — William R Alexander
*Assistant Examiner* — Sharrief I Broome
(74) *Attorney, Agent, or Firm* — Hauptman Ham, LLP

(57) ABSTRACT

A microscope apparatus including an electromagnetic wave source configured to generate an illuminating electromagnetic wave. The microscope apparatus includes a first beam splitter configured to split the illuminating electromagnetic wave into a first component along a first path and a second component along a second path. The microscope apparatus includes a movable reflector module configured to adjust the second path. The microscope apparatus includes a second beam splitter configured to recombine the first component and the second component. The microscope apparatus includes an observing device arranged along the first path and configured to receive the recombined first component and second component. The microscope apparatus is configured to acquire, from the observing device, a phase image based on positioning of the movable reflector module and representative of an electric field distribution near an object located along the first path between the first beam splitter and the second beam splitter.

20 Claims, 4 Drawing Sheets

Related U.S. Application Data continuation of application No. 13/328,591, filed on Dec. 6, 2011, now Pat. No. 8,928,973.

(58) Field of Classification Search
CPC ............ G02B 21/0056; G02B 21/0032; G02B 21/18; G02B 21/0004; G02B 21/36; G02B 21/086; G02B 27/283; G02B 21/367; G02B 26/06; G02B 27/28; G02B 21/002; G02B 21/0076; G02B 21/082; G02B 21/34; G02B 21/361
See application file for complete search history.

(56) References Cited

U.S. PATENT DOCUMENTS

| | | | |
|---|---|---|---|
| 6,002,480 A * | 12/1999 | Izatt | G01J 3/4412 356/479 |
| 6,583,624 B1 | 6/2003 | Muthupillai et al. | |
| 8,218,152 B1 | 7/2012 | Marks et al. | |
| 2005/0057756 A1* | 3/2005 | Fang-Yen | G01B 9/0209 356/497 |
| 2006/0274169 A1* | 12/2006 | Watanabe | G02B 15/177 348/240.3 |
| 2007/0035734 A1* | 2/2007 | Muller | G01N 21/31 356/432 |
| 2008/0225921 A1 | 9/2008 | Kuss et al. | |
| 2011/0032479 A1 | 2/2011 | Utsunomiya | |
| 2012/0162755 A1* | 6/2012 | Stroessner | G02B 21/086 359/386 |
| 2013/0293698 A1* | 11/2013 | Yoshida | G02B 21/125 348/79 |

\* cited by examiner

MICROSCOPE APPARATUS

PRIORITY CLAIM

The present application is a divisional of U.S. application Ser. No. 14/559,492, filed Dec. 3, 2014, which is a continuation of U.S. application Ser. No. 13/328,591, filed Dec. 16, 2011, now U.S. Pat. No. 8,928,973, issued Jan. 6, 2015, which are incorporated herein by reference in their entireties.

TECHNICAL FIELD

The present disclosure relates generally to a microscope.

BACKGROUND

A microscope system is used to acquire the intensity images of objects. For integrated circuit fabrication, a photomask image is acquired using a microscope to predict patterns to be formed in a resist layer on a wafer.

BRIEF DESCRIPTION OF THE DRAWINGS

Reference is now made to the following descriptions taken in conjunction with the accompanying drawings, in which.

DETAILED DESCRIPTION

The making and using of various embodiments are discussed in detail below. It should be appreciated, however, that the present disclosure provides many applicable inventive concepts that can be embodied in a wide variety of specific contexts. The specific embodiments discussed are illustrative of specific ways to make and use, and do not limit the scope of the disclosure.

In addition, spatially relative terms, for example, "lower," "upper," "horizontal," "vertical," "above," "below," "up," "down," "top," "bottom," etc. as well as derivatives thereof (e.g., "horizontally," "downwardly," "upwardly," etc.) are used for ease of the present disclosure of one features relationship to another feature. The spatially relative terms are intended to cover different orientations of the device including the features.

Figure 1:
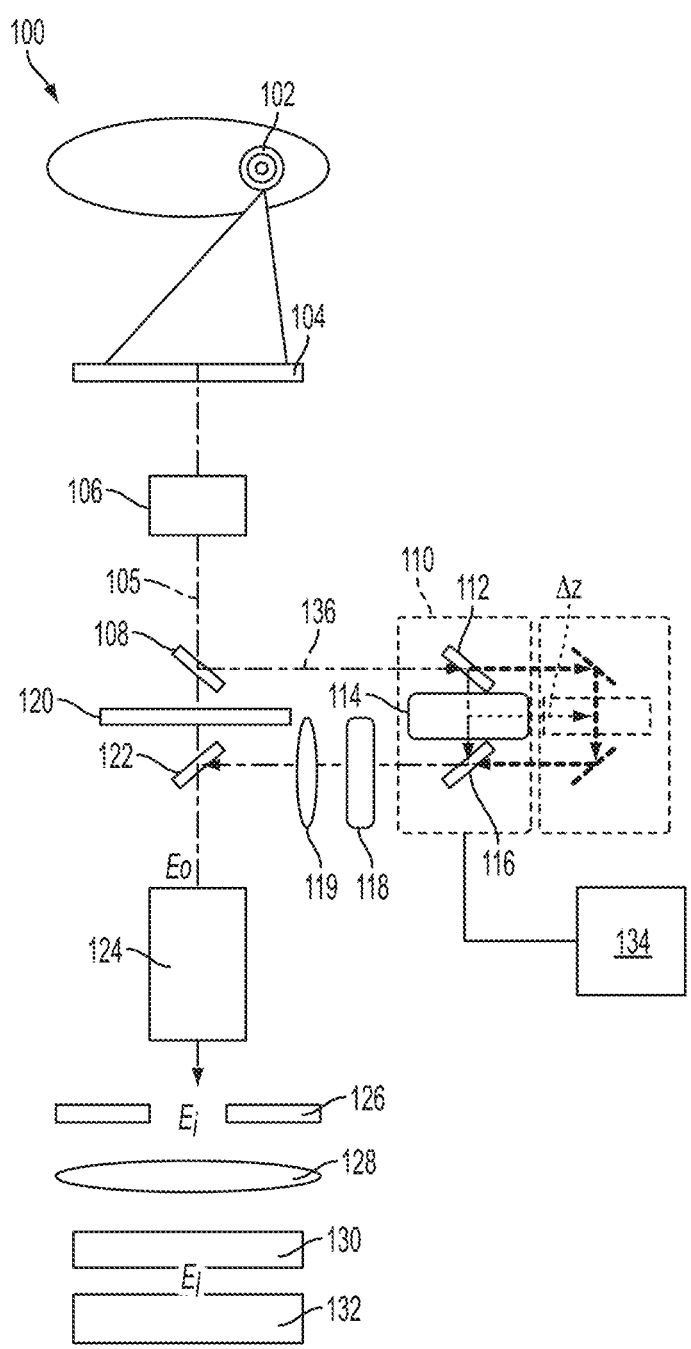
FIG. 1 is a schematic diagram of an exemplary microscope apparatus for phase image acquisition according to some embodiments.

FIG. 1 is a schematic diagram of an exemplary microscope apparatus for phase image acquisition according to some embodiments. The microscope apparatus 100 includes an electromagnetic wave source 102 ("source"), e.g., a point source with off-axis illumination (OAI)/free form illumination (FFI), a coherent source, or any other suitable source. The illuminating electromagnetic wave from the source 102 is not limited to (visible) light, but the terms "light" and "optical" are used as examples in the following for illustration. Also, the microscope apparatus 100 acquires phase images of a photomask 120 ("mask") in one example. However, the microscope apparatus 100 can be used to acquire phase images of other objects.

A polarizer (polarizing filter) 104 polarizes the (illuminating) light from the source 102. For example, light passing through the polarizer 104 oscillates in only one direction, and is referred to as polarized light (and in at least one embodiment, a linear polarized light). A condenser lens 106 concentrates the light from the source 102 to provide a relatively (or generally) homogeneous illumination. Beam splitters 108 and 122 are used to split or recombine/rejoin the light.

In some embodiments, the source 102, the polarizer 104, the condenser lens 106, the beam splitters 108 and 122, and the objective lens 124, the NA turn table 126, the Bertrand lens 128, the tube lens 130, and the camera 132 are aligned along an axis 105 and these elements are held by any suitable housing or clamping structures.

A movable reflector module 110 includes reflectors 112 and 116, and a dispersion compensator plate 114. After the illuminating light is polarized by the polarizer 104, the light is split by the beam splitter 108 before the mask 210 and to recombine the split light after the mask 210 by the optical elements such as the beam splitter 122 and reflectors 112 and 116. The dispersion compensator plate 114 reduces dispersion induced by optical path difference for different electromagnetic wave frequencies. Dispersion is caused by different group/phase velocity of the light depending on its frequency. A shutter 118 opens or closes the light path through the movable reflector module 110. For example, the shutter 118 can be opened to allow the light to travel on the light path 136 from the beam splitter 108 to reflectors 112 and 116, and to the beam splitter 122. A focusing lens 119 transfers a parallel light into a beam which contains all oblique angles of light by focusing.

An objective lens 124 magnifies and projects the (illuminating) light after the mask 120 that has the mask pattern towards an observing device such as a camera 132, e.g., a charge-coupled device (CCD) camera. The focusing lens 119 can be similar to the objective lens 124 in a reverse direction in some embodiments. A numerical aperture (NA) turn table 126 adjusts the NA of the objective lens 124. NA is the range of angles over which the system can accept or emit light such that the NA of a beam is constant as the beam goes from one material to another provided there is no optical power at the interface. NA is a measure of the ability to gather light and resolve fine specimen detail at a fixed object distance. An exemplary NA range is 0.9-1.4.

A Bertrand lens (phase telescope) 128 is moveable to get images of the NA plane (pupil plane, Fourier plane). The Bertrand lens 128 is an optical device used in aligning the various optical components of a microscope. In particular it allows observation of the back focal plane of the objective lens 124 and its conjugate focal planes. The Bertrand lens 128 moves the intermediate image plane to a point where it can be observed. A tube lens 130 is placed before the camera 132 in the microscope apparatus 100, for the purpose of providing a parallel optical path. Images will be projected on the camera 132 after the tube lens 132 to obtain the phase images.

The electric field distribution $E_o$ on the pupil plane at the objective lens 124 is referred to as a near field since it is close to the mask 120. In some examples, the distance between the near field image region to the mask 120 is less than a few wavelengths of the illuminating light. A latent image is an image from the electric field distribution $E_1$ at the camera 132. The phase image acquisition from the mask 120 using the microscope apparatus 100 in FIG. 1, allows reconstructing the near-field image, which helps to precisely predict the latent image on a resist layer of a wafer for real integrated circuit fabrication.

A moving mechanism 134 (e.g., a step motor) moves the movable reflector module 110 by a controlled distance (Δz) to change the optical path length 136 between the beam splitters 108 and 122 via the reflectors 112 and 116. When the position (z) of the movable reflector module 110 is moved by Δz, the optical path length 136 is changed by 2Δz. At least two images obtained with the movable reflector module 110 at two different respective z-positions are used to obtain phase information. In at least one embodiment, more detailed phase information is obtained with multiple images from multiple positions of the movable reflector module 110.

Figure 2:
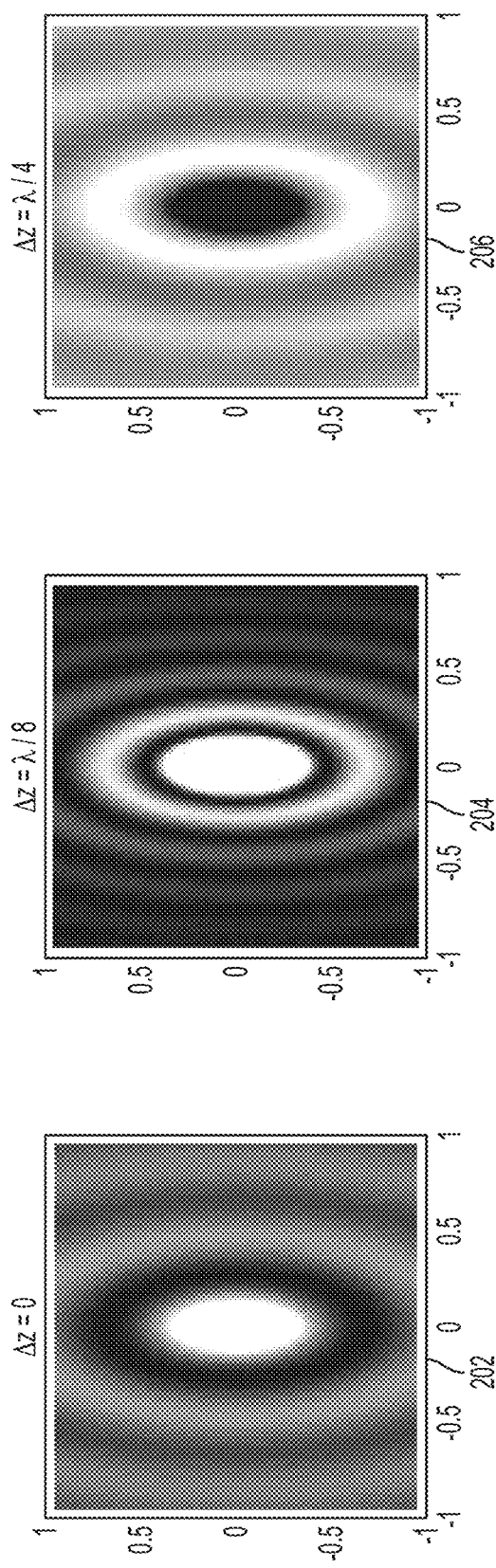
FIG. 2 is a set of exemplary phase images acquired using the microscope apparatus in FIG. 1.

For example, a phase image can be acquired using the camera 132 at an initial position (Δz=0), then at the second position (Δz=λ/8), and at the third position (Δz=λ/4), where X is the wavelength of the illuminating light. Exemplary phase images in FIG. 2 are acquired using the microscope apparatus 100 in FIG. 1 with intensity variation of each pixel at the (CCD) camera 132. In FIG. 2, a phase image 202 is with Δz=0, a phase image 204 is with Δz=λ/8, and a phase image 206 is with Δz=λ/4.

Figure 3A:
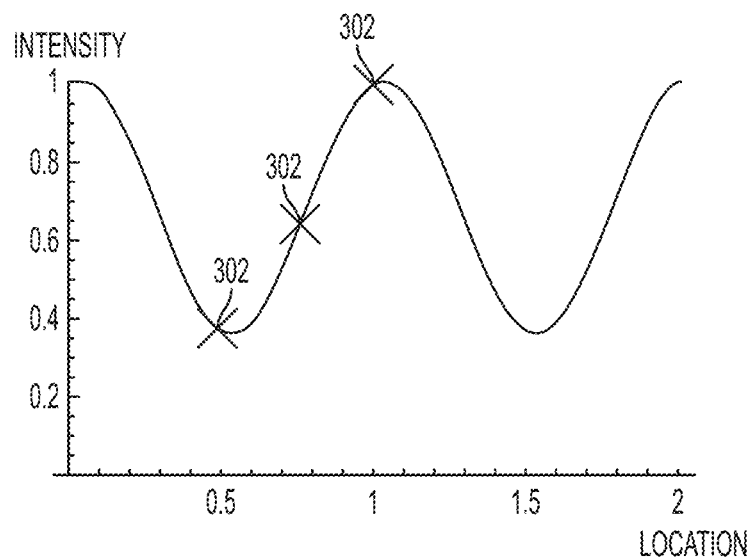
FIGS. 3A and 3B are exemplary intensity plots used to extract phase information.
Figure 3B:
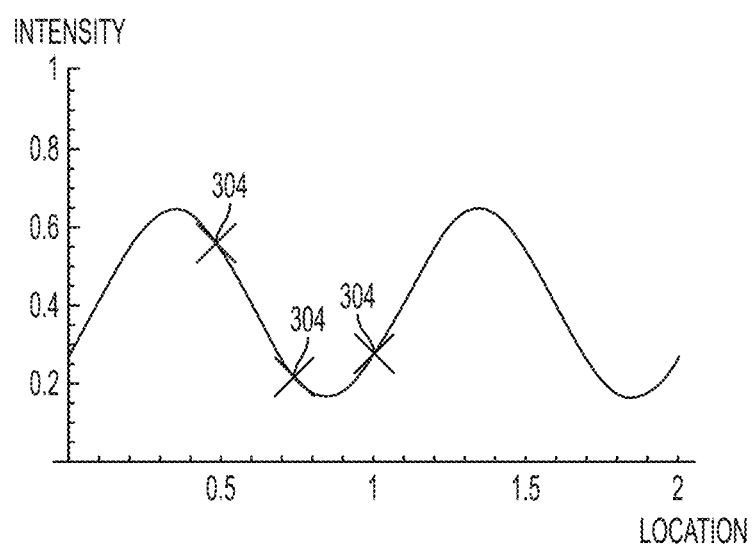

FIGS. 3A and 3B are exemplary intensity plots used to extract phase information. FIG. 3A is an intensity plot with Δz=0. The intensity plots are obtained from phase images such as shown in FIG. 2 along a z-axis through the center. The intensity can be described by the following equation:

$$\text{Intensity}=|E_0\text{Exp}(\text{if})+E_r\text{Exp}(-i4\pi\Delta z/\lambda)|^2 \quad \text{Equation (1)},$$

where $E_0$ is a real number light field, Er is a complex number light field, f is phase, z is the position of each sampling point, and λ is the wavelength of the light. FIG. 3B is an intensity plot with different z.

By measuring the relative intensity of three sampling points 302 in FIG. 3A and three sampling points 304 in FIG. 3B, the phase f could be determined from Equation (1). More phase images (e.g., three or more) with different z-positions make phases determination more precise and the trends of intensity variations can be more accurately described.

The microscope apparatus 100 is an imaging system to collect the light field from an object (such as a mask 120) to an image plane of the camera 132. The light fields from different light paths interfere with each other at the pupil plane of the NA turn table 126 (from the two light paths split at the beam splitter 108 and recombined/rejoined at the beam splitter 122). As described above, the phase information of the light field can be obtained from the phase images such as FIG. 2.

The phase information can be used to reconstruct the image at a photoresist for a real integrated circuit fabrication when the mask 120 is used. Such image reconstruction is used for advanced integrated circuit technology nodes as the integrated circuit scale shrinks, such as 20 nm technology and beyond, because the image variation through the direction of imaging depth is much larger than previous technology nodes. With an image reconstruction method including the phase information, the photoresist image can be more accurately obtained.

The electric field distribution $E_o$ on the pupil plane at the objective lens 124 is referred to as a near field since it is close to the mask 120. In some examples, the distance between the near field image region to the mask 120 is less than a few wavelengths of the illuminating light. A latent image is an image from the electric field distribution $E_1$ at the camera 132. The phase image acquisition from the mask 120 using the microscope apparatus 100 in FIG. 1, allows reconstructing the near-field image, which helps to precisely predict the latent image on a resist layer of a wafer for real integrated circuit fabrication.

Figure 4:
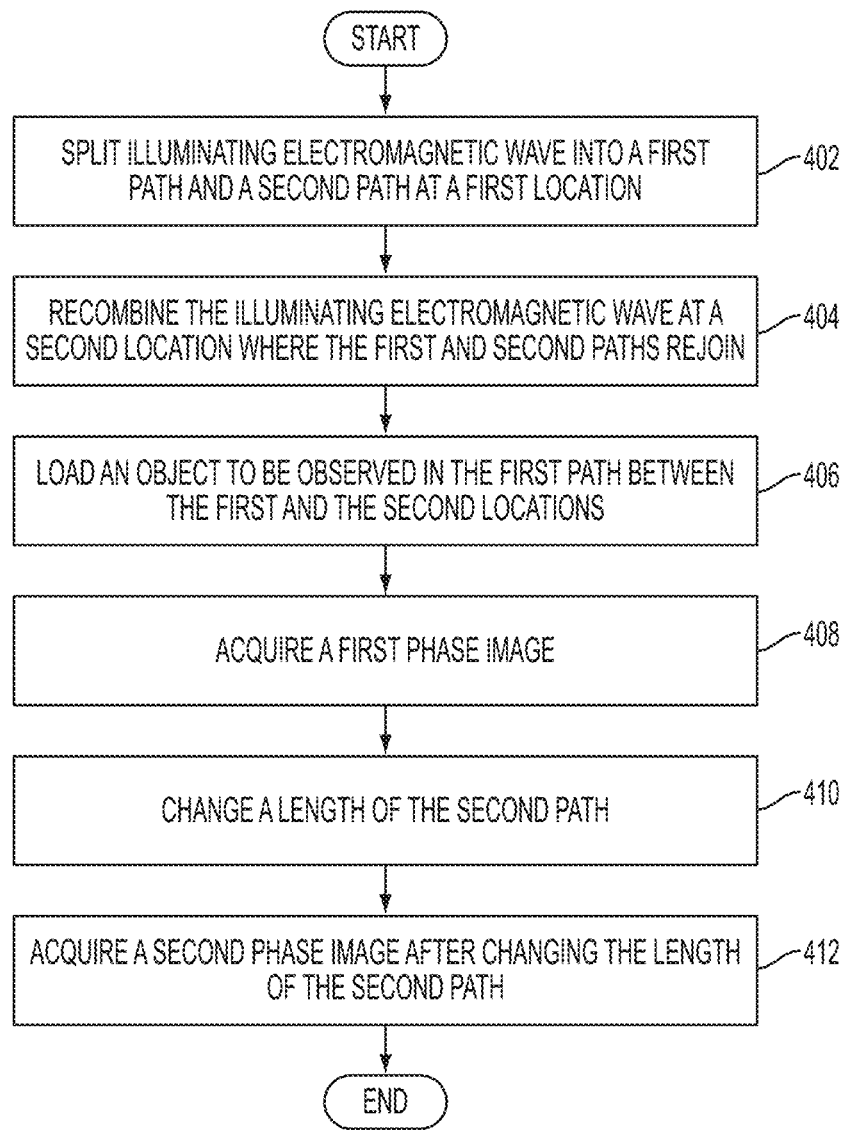
FIG. 4 is a flowchart of an exemplary method of acquiring phase images using the microscope apparatus in FIG. 1 according to some embodiments.

FIG. 4 is a flowchart of an exemplary method of acquiring phase images using the microscope in FIG. 1 according to some embodiments. At step 402, illuminating electromagnetic wave is split into a first path and a second path at a first location. At step 404, the illuminating electromagnetic wave is recombined at a second location where the first and second paths rejoin. At step 406, an object to be observed, such as a photomask for integrated circuit fabrication, is loaded in the first path between the first and the second locations. At step 408, the first phase image is acquired. At step 410, the length of the second path is changed. At step 412, the second phase image is acquired after changing the length of the second path.

Before or during acquiring phase images following the above steps, other steps and adjustments may be performed. For example, the object such as the photomask is loaded in the microscope. The object is aligned for the microscope. In some applications, a C/R (clear reference) position is defined on the object (mask) for acquiring a clear reference image without features. The microscope may automatically adjust the for C/R position during an automated process, then acquire a clear reference image. A position for an objective lens is adjusted for focus. The position of the condenser lens is adjusted to have even illumination on the object. For example, a condenser position is achieved by focusing the image on an observing device such as a CCD camera. The NA is aligned to be centered in the beam path on the pupil plane. The right exposure time is determined for each type of illumination settings to achieve good intensity level on the acquired images from the camera for the desired settings.

The above method embodiment shows exemplary steps, but they are not necessarily required to be performed in the order shown. Steps may be added, replaced, changed order, and/or eliminated as appropriate, in accordance with the spirit and scope of embodiment of the disclosure.

An aspect of this description relates to a microscope apparatus including an electromagnetic wave source configured to generate an illuminating electromagnetic wave. The microscope apparatus includes a first beam splitter configured to split the illuminating electromagnetic wave into a first component along a first path and a second component along a second path. The microscope apparatus further includes a movable reflector module configured to adjust a portion of the second path. The microscope apparatus further includes a second beam splitter configured to recombine the first component and the second component. The microscope apparatus further includes an observing device arranged along the first path and configured to receive the recombined first component and second component. The microscope apparatus is configured to acquire, from the observing device, a phase image based on positioning of the movable reflector module and representative of an electric field distribution near an object located along the first path between the first beam splitter and the second beam splitter. In some embodiments, the phase image is representative of the electric field distribution at a distance from the object that is less than three wavelengths of the illuminating electromagnetic wave. In some embodiments, the movable reflector module comprises a dispersion compensator plate. In some embodiments, the microscope apparatus further includes one or more of a focusing lens along the second path or a shutter configured to open or close the second path. In some embodiments, the microscope apparatus further includes a moving mechanism configured to move the movable reflector module by a controlled distance. In some embodiments, the observing device is a charge-coupled device (CCD) camera. In some embodiments, the microscope apparatus further includes one or more of a condenser lens, a polarizer configured to polarize the illuminating electromagnetic wave, a numerical aperture (NA) turntable, or a Bertrand lens. In some embodiments, the electromagnetic wave source, the first beam splitter, the object, the second beam splitter, and the observing device are aligned along an axis.

An aspect of this description relates to a microscope. The microscope includes a light source configured to generate an illuminating light. The microscope further includes an observation target. The microscope further includes a beam splitter between the light source and the observation target, wherein the beam splitter is configured to split the illuminating light into a first component along a first path and a second component along a second path. The microscope further includes a movable reflector module configured to receive the second component, wherein the movable reflector module is configured to move in a direction perpendicular to the first path. The microscope further includes a beam combiner configured to recombine the first component and the second component into a combined beam, wherein the observation target is between the beam splitter and the beam combiner. The microscope further includes a sensor configured to receive the combined beam, wherein the sensor is configured to detect a phase image representative of an electric field distribution near the observation target. In some embodiments, the microscope further includes a moving mechanism configured to control movement of the movable reflector module. In some embodiments, the observation target comprises a mask. In some embodiments, the movable reflector module comprises a plurality of reflectors. In some embodiments, the movable reflector module comprises a dispersion compensator plate between adjacent reflectors of the plurality of reflectors. In some embodiments, the microscope further includes a shutter between the movable reflector module and the beam combiner. In some embodiments, the light source comprises at least one of a point source with off-axis illumination, a free form illumination source or a coherent source.

An aspect of this description relates to a microscope. The microscope includes a light source configured to generate an illuminating light. The microscope further includes an observation target load location. The microscope further includes a beam splitter between the light source and the observation target load location, wherein the beam splitter is configured to pass a first component of the illuminating light along a first path and to reflect a second component of the illuminating light along a second path. The microscope further includes a movable reflector module configured to receive the second component, wherein the movable reflector module is configured to move in a direction parallel to the second path. The microscope further includes a beam combiner configured to recombine the first component and the second component into a combined beam. The microscope further includes a sensor configured to receive the combined beam, wherein the sensor is configured to detect a phase image representative of an electric field distribution near the observation target load location. In some embodiments, the light source is configured to emit non-visible light. In some embodiments, the microscope further includes a shutter along the second path between the beam combiner and the movable reflector module. In some embodiments, the microscope further includes a numerical aperture turn table configured to adjust a numerical aperture. In some embodiments, the numerical aperture ranges from about 0.9 to about 1.4.

A skilled person in the art will appreciate that there can be many embodiment variations of this disclosure. Although the embodiments and their features have been described in detail, it should be understood that various changes, substitutions and alterations can be made herein without departing from the spirit and scope of the embodiments. Moreover, the scope of the present application is not intended to be limited to the particular embodiments of the process, machine, manufacture, and composition of matter, means, methods and steps described in the specification. As one of ordinary skill in the art will readily appreciate from the disclosed embodiments, processes, machines, manufacture, compositions of matter, means, methods, or steps, presently existing or later to be developed, that perform substantially the same function or achieve substantially the same result as the corresponding embodiments described herein may be utilized according to the present disclosure.

What is claimed is:

1. A microscope apparatus, comprising:
    an electromagnetic wave source configured to generate an illuminating electromagnetic wave;
    a first beam splitter configured to split the illuminating electromagnetic wave into a first component along a first path and a second component along a second path;
    a movable reflector module configured to adjust a portion of the second path;
    a second beam splitter configured to recombine the first component and the second component; and
    an observing device arranged along the first path and configured to receive the recombined first component and second component,
    wherein the microscope apparatus is configured to acquire, from the observing device, a phase image based on positioning of the movable reflector module and representative of an electric field distribution near an object located along the first path between the first beam splitter and the second beam splitter.

2. The microscope apparatus of claim 1, wherein the phase image is representative of the electric field distribution at a distance from the object that is less than three wavelengths of the illuminating electromagnetic wave.

3. The microscope apparatus of claim 1, wherein the movable reflector module comprises a dispersion compensator plate.

4. The microscope apparatus of claim 1, further comprising one or more of a focusing lens along the second path or a shutter configured to open or close the second path.

5. The microscope apparatus of claim 1, further comprising a moving mechanism configured to move the movable reflector module by a controlled distance.

6. The microscope apparatus of claim 1, wherein the observing device is a charge-coupled device (CCD) camera.

7. The microscope apparatus of claim 1, further comprising one or more of a condenser lens, a polarizer configured to polarize the illuminating electromagnetic wave, a numerical aperture (NA) turntable, or a Bertrand lens.

8. The microscope apparatus of claim 1, wherein the electromagnetic wave source, the first beam splitter, the object, the second beam splitter, and the observing device are aligned along an axis.

9. A microscope, comprising:
a light source configured to generate an illuminating light;
an observation target;
a beam splitter between the light source and the observation target, wherein the beam splitter is configured to split the illuminating light into a first component along a first path and a second component along a second path;
a movable reflector module configured to receive the second component, wherein the movable reflector module is configured to change a length of the second path;
a beam combiner configured to recombine the first component and the second component into a combined beam, wherein the observation target is between the beam splitter and the beam combiner; and
a sensor configured to receive the combined beam, wherein the sensor is configured to detect a phase image representative of an electric field distribution near the observation target.

10. The microscope of claim 9, further comprising a moving mechanism configured to control movement of the movable reflector module.

11. The microscope of claim 9, wherein the observation target comprises a mask.

12. The microscope of claim 9, wherein the movable reflector module comprises a plurality of reflectors.

13. The microscope of claim 12, wherein the movable reflector module comprises a dispersion compensator plate between adjacent reflectors of the plurality of reflectors.

14. The microscope of claim 9, further comprising a shutter between the movable reflector module and the beam combiner.

15. The microscope of claim 9, wherein the light source comprises at least one of a point source with off-axis illumination, a free form illumination source or a coherent source.

16. A microscope, comprising:
a light source configured to generate an illuminating light;
an observation target load location;
a beam splitter between the light source and the observation target load location, wherein the beam splitter is configured to pass a first component of the illuminating light along a first path and to reflect a second component of the illuminating light along a second path;
a movable reflector module configured to receive the second component, wherein the movable reflector module is configured to move in a direction parallel to the second path;
a beam combiner configured to recombine the first component and the second component into a combined beam; and
a sensor configured to receive the combined beam, wherein the sensor is configured to detect a phase image representative of an electric field distribution near the observation target load location.

17. The microscope of claim 16, wherein the light source is configured to emit non-visible light.

18. The microscope of claim 16, further comprising a shutter along the second path between the beam combiner and the movable reflector module.

19. The microscope of claim 16, further comprising a numerical aperture turn table configured to adjust a numerical aperture.

20. The microscope of claim 19, wherein the numerical aperture ranges from about 0.9 to about 1.4.

* * * * *